United States Patent

Nygaard

[11] Patent Number: 5,503,193
[45] Date of Patent: Apr. 2, 1996

[54] REUSABLE INSULATION JACKET FOR TUBING

[76] Inventor: Noble A. Nygaard, Suite 1, 10255 Inver Grove Trail, Inver Grove Heights, Minn. 55076

[21] Appl. No.: 68,384

[22] Filed: May 28, 1993

[51] Int. Cl.⁶ ........................................................ F16L 9/14
[52] U.S. Cl. ............................ 138/149; 138/110; 137/375
[58] Field of Search .................................... 138/149, 108, 138/103, 109, 156, 128, 147, 110; 285/45, 47; 137/375; 428/99

[56] References Cited

U.S. PATENT DOCUMENTS

| | | | |
|---|---|---|---|
| 397,822 | 2/1889 | Suhr | 138/149 |
| 2,545,030 | 3/1951 | Isenberg et al. | 138/149 |
| 2,695,254 | 11/1954 | Isenberg | 138/149 |
| 2,872,947 | 2/1959 | Isenberg | 138/149 |
| 3,237,796 | 3/1966 | Callahan | 138/110 |
| 3,929,167 | 12/1975 | Bickel | 138/149 |
| 3,941,159 | 3/1976 | Toll | 138/149 |
| 4,095,937 | 6/1978 | Colburn et al. | 138/149 |
| 4,181,157 | 1/1980 | DeCamp | 138/110 |
| 4,218,814 | 8/1980 | Hodapp | 138/149 |
| 4,415,184 | 11/1983 | Stephenson et al. | 285/47 |
| 4,590,108 | 5/1986 | Nippe | 138/149 |
| 4,735,235 | 4/1988 | Anderson et al. | 138/149 |
| 4,930,543 | 6/1990 | Zuiches | 138/110 |
| 4,944,973 | 7/1990 | Follette | 138/110 |
| 4,985,942 | 1/1991 | Shaw | 138/110 |
| 5,099,889 | 3/1992 | Ratzlaff | 138/110 |

FOREIGN PATENT DOCUMENTS 116651  10/1929  Austria .................................... 138/110

*Primary Examiner*—James E. Bryant, III
*Attorney, Agent, or Firm*—Palmatier, Sjoquist & Helget

[57] ABSTRACT

A reusable insulation jacket for splicing and termination of industrial tubing carrying extreme hot and cold materials comprises a rectangular fiberglass mat. The mat is of a width as to completely wrap the tubing and overlap itself whereat complimentary releasable fastening means securely hold the mat in place to insulate the tubing from fire and to prevent an individual from otherwise being burned from contacting the tubing. Optionally, a frustum-shaped reducing adaptor may be utilized when the insulation jacket is used in combination with preinsulated tubing.

8 Claims, 3 Drawing Sheets

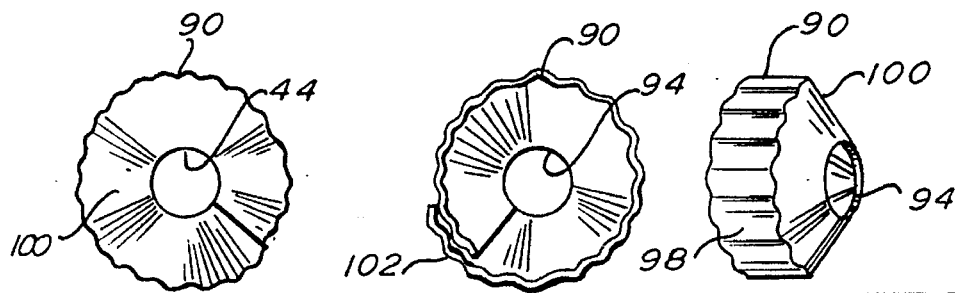
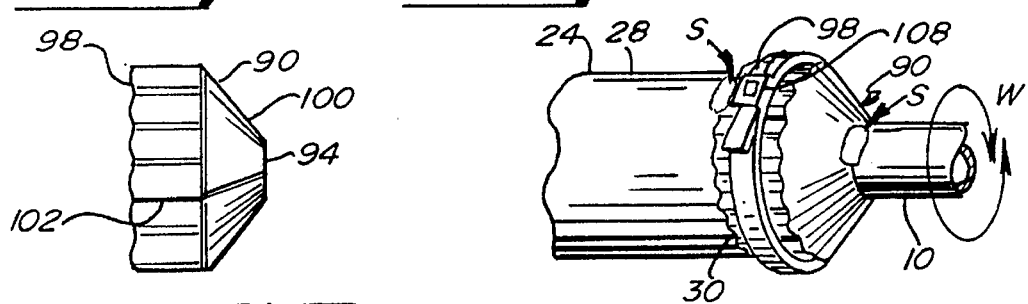
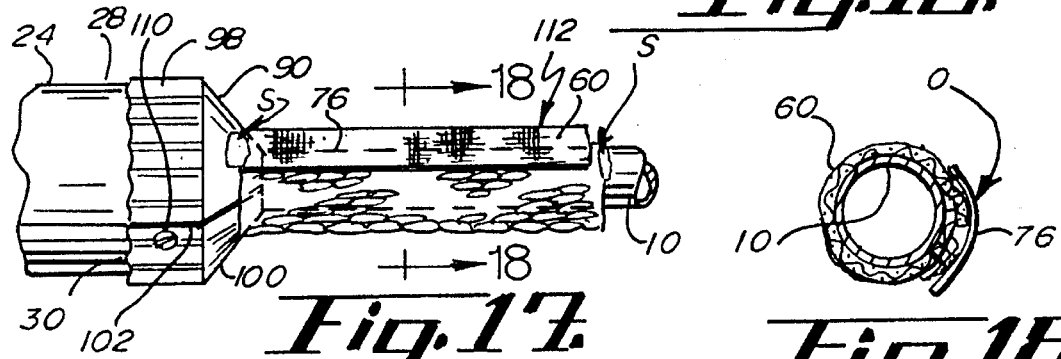
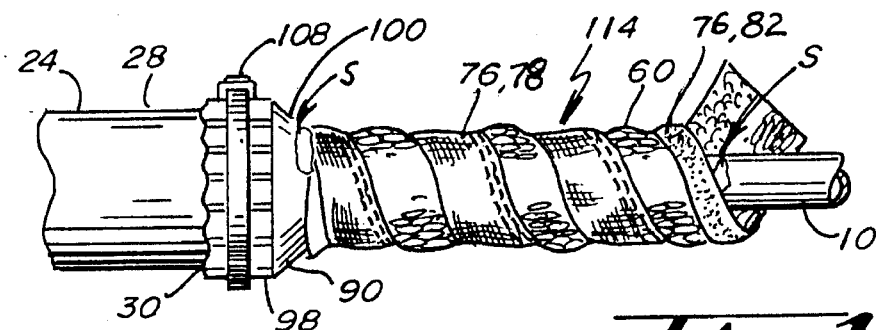

REUSABLE INSULATION JACKET FOR TUBING

BACKGROUND OF THE INVENTION

This invention relates to an insulation jacket for tubing, and more particularly, to a reusable insulation jacket for tubing which conveys steam, hot materials, condensate, lubricants, cryogenic fluids and cold materials typically used in heating and air conditioning, power facilities, food processing facilities and petrochemical facilities.

While cryogenic fluids approach absolute zero, steam for use in power may typically range between 270° F. and 300° F. These temperatures will easily burn an individual should they come in contact with either of these materials or the tubing, piping or conduiting transporting such materials or steam.

Such extreme temperature steam and cold materials conveyed in tubing are common in industrial applications, such as boilers and petrochemical plants, and typically requiring insulation about the tubing. Asbestos is no longer used. While fiberglass insulation materials may indeed be used, known applications are generally not very sophisticated and require substantial installation time and further treatment for preservation of the insulation against weather, moisture and other harsh chemicals.

Consequently, preinsulated tubing has been developed and is commonly used as shown in prior art FIGS. 1 through 6. More specifically, the tubing 10 may be of a copper or steel for extremely high temperatures and aluminum or plastic for lower temperatures. Illustratively, tubing 10 may convey steam to a steam engine 12, which may be a boiler, tank or some other vessel. Tubing 10 is connected to the steam engine 12 by way of entrance fittings 14. It is common for the tubing 10 to be repeatedly spliced and reconnected by splice connectors 16. The source of the steam for tubing 10 may be a steam manifold 18. Controlling the steam into the tubing 10 may be done by way of a valve 20.

Preinsulated tubing 10 is commercially available from Parker-Hannifin Corporation of Ravenna, Ohio, marketed under the Paraflex Division. Such tubing 10 commonly has a preinsulation 24 thereover comprised of fiberglass layers 26 covered by a plastic jacket 28 which may be polyvinylchloride, polyethylene or the like. At the preinsulation end 30 emerges tubing 10.

A tube splice 34 is common and illustrated in prior art FIGS. 1 through 3. A tube splice 34 comprises tubing 10 extending from the preinsulation ends 30 and being joined by splice connectors 16. Commonly, a woven fiberglass sheet 36, with or without a self-sticking, plastic wrap-backing, is woven about the tube splice 34. Thereafter, a vinyl tape 38 may be wrapped around the tube splice 34 to seal the fiberglass sheet 36 in a waterproof manner.

In another arrangement, tube 10 may terminate in an end 44 appropriate for connection to a steam engine 12 by way of entrance fittings 14 shown in FIGS. 1 and 4 through 6. At the preinsulation end 30, commonly the fiberglass 26 is cut out 46 and filled in a sealing manner with uncured or unvulcanized silicone fill 48. After curing, a woven fiberglass tape 50 may be wrapped in spiral fashion around the tube 10 and secured by wire or tie fasteners 52. Thereafter, a thick waterproof latex paint, such as Mastik, may be painted over the fiberglass 50 as to waterproof and seal the fiberglass insulation 50.

These prior known methods of insulating tube splices and tube ends are extremely time consuming. Furthermore, the completed insulation and sealing of tube splices or tube ends becomes permanent and requires significant effort to again access the tubing.

There is a significant need for a reusable, easy-to-use fiberglass mat jacket that is presealed and which will readily cover tubing in an easy fashion in application and removal.

SUMMARY OF THE INVENTION

A reusable insulation jacket for splicing and termination of industrial tubing carrying extreme hot and cold materials comprises a rectangular fiberglass mat. The mat is of a width as to completely wrap the tubing and overlap itself whereat complimentary releasable fastening means securely hold the mat in place to insulate the tubing from fire and to prevent an individual from otherwise being burned from contacting the tubing. Optionally, a frustum-shaped reducing adaptor may be utilized when the insulation jacket is used in combination with preinsulated tubing.

A principal object and advantage of the present invention is that the reusable insulation jacket is simple to apply, easy to remove and furthermore reusable.

Another object and advantage of the present invention is that it may be used with bare tubing as well as in splicing and tube end protection of preinsulated tubing.

Another object and advantage of the present invention is that it is relatively inexpensive to manufacture and saves a significant amount of man hours in both application and reusable removal.

Other objects and advantages will become obvious with the reading of the following specification and appended claims with a review of the Figures.

BRIEF DESCRIPTION OF THE DRAWINGS

FIG. 12 is the opposite side elevational view of the adaptor;

FIG. 13 is a front elevational view of the adaptor;

FIG. 14 is a rear elevational view of the adaptor;

FIG. 15 is a perspective view of the adaptor;

FIG. 16 is a perspective view of the adaptor fastened onto the preinsulated end of preinsulated tubing;

FIG. 17 is a front elevational view of the adaptor and fiberglass mat or jacket secured in straight arrangement to the preinsulated tubing;

FIG. 18 is a cross-sectional view taken along lines 18—18 of FIG. 17; and

FIG. 19 is a front elevational view of a preinsulated tube insulated and sealed by the fiberglass mat in spiral fashion together with the adaptor.

DETAILED SPECIFICATION

Figure 1:
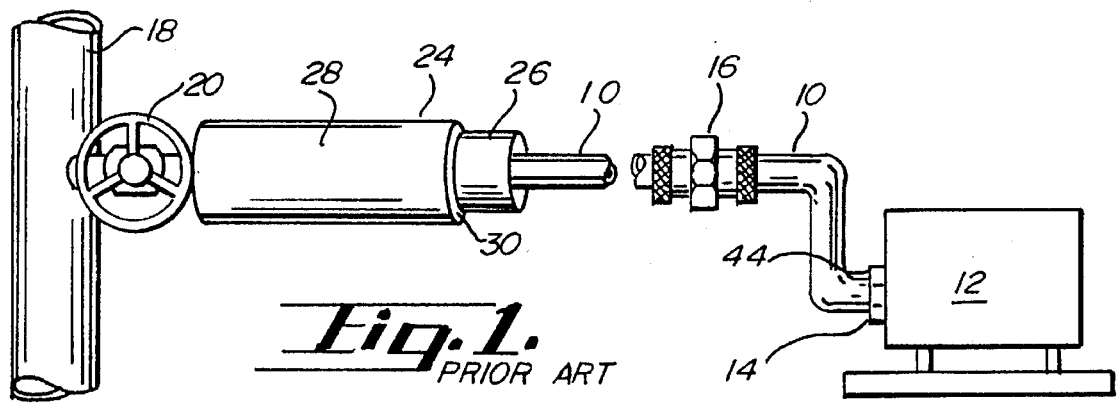
FIG. 1 is a partially schematic prior art view from a steam manifold to a steam engine.
Figure 2:
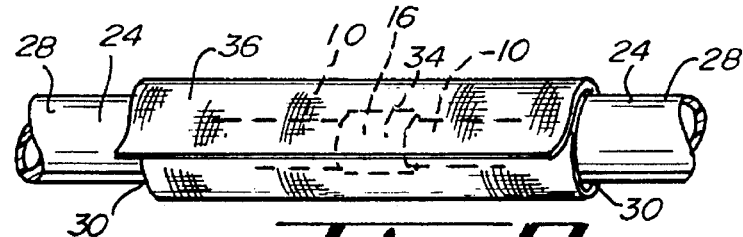
FIG. 2 is a front elevational prior art view of a partially spliced preinsulated tube.
Figure 3:
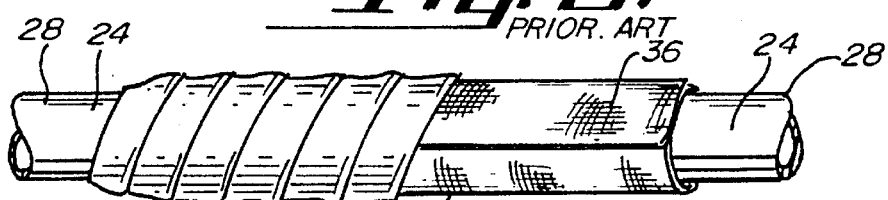
FIG. 3 is a front elevational prior art view of a nearly completed splice of preinsulated tubing.
Figure 4:
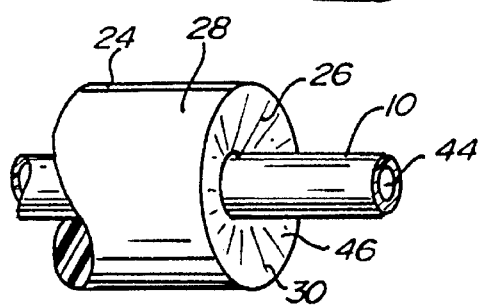
FIG. 4 is a perspective prior art view of a tube end of preinsulated tubing.
Figure 5:
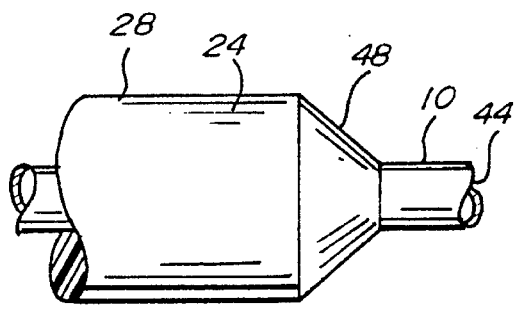
FIG. 5 is a front elevational prior art view of a partially sealed preinsulation end of a preinsulated tubing.
Figure 6:
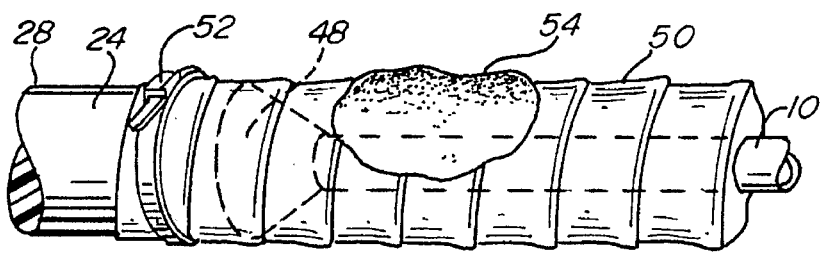
FIG. 6 is a front elevational prior art view of the tube end of a preinsulated tube spirally wrapped in insulation and partially sealed.
Figure 7:
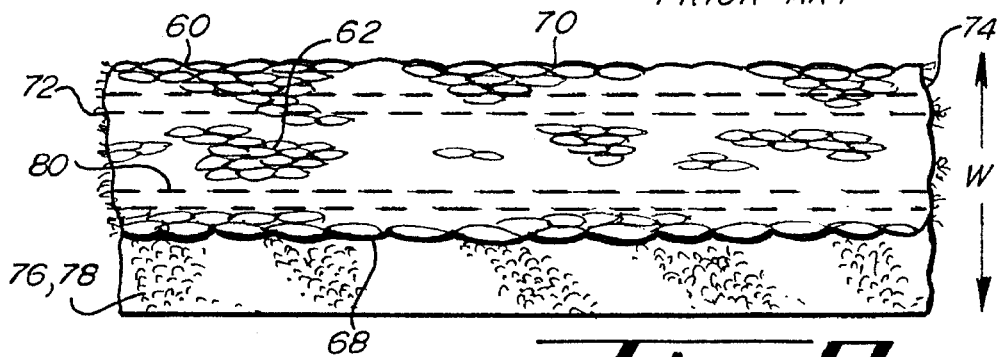
FIG. 7 is a front elevational view of the fiberglass jacket of the present invention.
Figure 9:
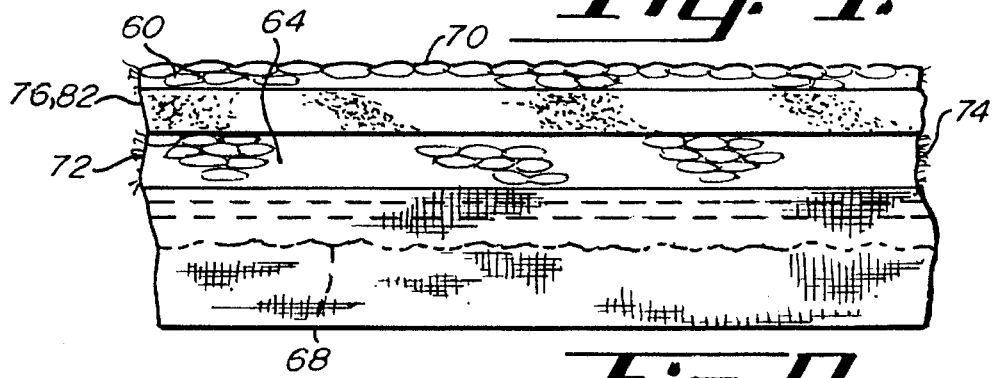
FIG. 9 is a rear elevational view of the fiberglass mat or jacket.
Figures 8, 10, 11:
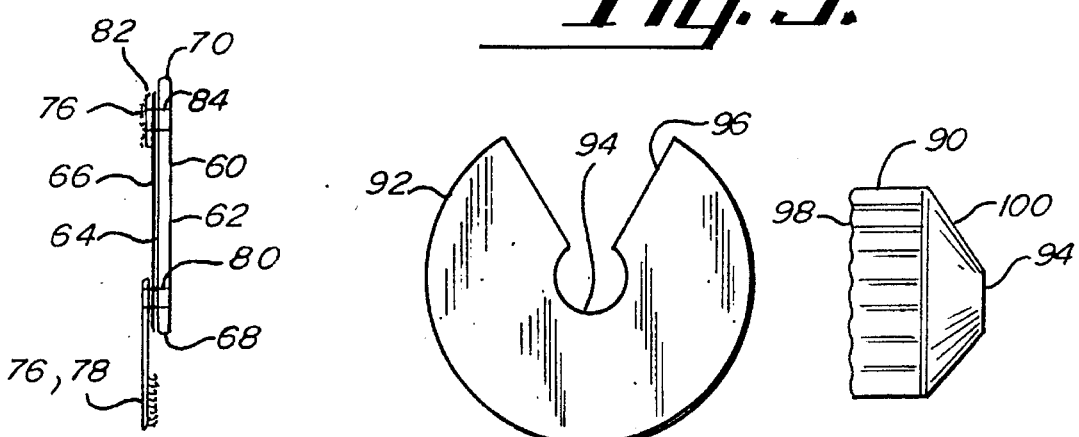
FIG. 8 is a side elevational view of the mat or jacket showing the fastening means in more detail together with a silicone sealing layer or coating.
FIG. 10 is a plan view of an aluminum blank for the frustum-shaped reducing adaptor of the present invention.
FIG. 11 is a side elevational view of the adaptor.

Referring to FIGS. 7 through 19, the fabric fiberglass mat or jacket 60 together with the frustum-shaped reducing adaptor 90 may be seen and understood in construction and use in sealably insulating tubing splices and ends.

More specifically, the fiberglass mat or jacket 60 illustratively may be on a roll approximating 3" wide and ¼" thick for ½" tubing 10. Please note that dimensions are for illustrative purposes only and are not to be deemed restrictive in interpretation. The mat 60 has an inside face 62 which will confront tube 10 and an outside face 64. Suitably the outside face 64 is sealed, such as with a silicone impregnate coating 66, to seal the mat 60 from moisture, water and harsh chemicals. The mat or jacket 60 has a first elongate side 68 and a second elongate side 70, and is suitably of a predetermined width (Arrow W) as previously described. Upon severing the mat 60 from a roll, it will then have a first short end 72 and an opposing second short end 74.

Fastening means 76 are suitably used with the invention. Applicant has found that hook and loop materials, such as Velcro, work well with this application. The hook material 78 is suitably affixed to the outside face 64 of the mat 60 appropriately along the first elongate side 68 and held thereat appropriately by stitching 80. A second complimentary loop material 82 is also on the outside face 64 and suitably adjacent or close to the second elongate side 70 and held thereat by stitching 84. Advantageously, the loop material 82 is spaced inward somewhat from the second elongate side 70 as to assure that the mat 60 will completely wrap around and overlap (Arrow O in FIG. 8) itself when insulating tubing 10.

The frustum-shaped reducing adaptor 90 is suitably made from an aluminum blank 92 which is punched to form the adaptor 90. The adaptor 90 has a central aperture 94 of a diameter only slightly larger than that of tubing 10. A pie slice 96 is removed from the blank 92 prior to punching to permit the adaptor blank to conform to its frustum shape. The adaptor 90 has a preinsulation engaging collar portion 98 which will readily fit over the preinsulation end 30. From the collar 98, the adaptor 90 has a necked-down or cone portion 100 and also has an overlapping portion 102 to assure a complete seal about the preinsulation end 30. The preinsulation end collar portion 90 appropriately may be secured to the preinsulation end 30 suitably by a tie 108 or a screw 110. Unvulcanized silicone (Arrow S) may be applied at the juncture of the preinsulation end 30 and collar portion 98, as shown, which will also secure the adaptor 90 to preinsulated end 30 after the silicone has become vulcanized or cured.

In insulating tube splices 34 and bare tubing 10, the fiberglass jacket 60 may be utilized with or without the frustum-shaped reducing adaptor 90. Illustratively in FIGS. 16 through 19, the adaptor 90 is utilized. Initially, the adaptor 90 is fitted wherein tubing 10 extends through the central aperture 94 and the collar 98 is fitted over the preinsulation end 30. Unvulcanized silicone (Arrow S) may be utilized by application to the adaptor 90 at the collar 98 to preinsulation end 30 and at central aperture 94 where tubing 10 passes therethrough to cause a seal thereat after vulcanization or curing. A tie 108 or screw 110 may be utilized to temporarily or permanently secure the adaptor 90 in place. It may be seen that the hook material 78 of fastening means 76 overlaps loop material 82 to secure jacket 60 about tubing 10. Thereafter, the fiberglass jacket 60 of a predetermined length may be wrapped in straight jacket fashion 112 shown in FIG. 17 with a small amount of unvulcanized silicone (Arrow S) may be applied to the short ends 72 and 74 of the jacket 60 at their juncture with tubing 10 to cause a seal thereat after vulcanization or curing. FIG. 18 clearly shows that the mat or jacket 60 overlaps itself as to assure that the fastening means 76 do not come in contact with the extreme heated or chilled tubing 10.

Alternatively, FIG. 19 shows that the fiberglass mat or jacket 60 may appropriately be spiral wrapped 114. Although this arrangement is possible, it does consume greater lengths of jacket 60 as opposed to the straight jacket fashion 112. It may be seen that the hook material 78 of fastening means 76 overlaps material 82 to secure jacket 60 about tubing 10.

The present invention may be embodied in other specific forms without departing from the spirit of essential attributes thereof; therefore, the illustrated embodiment should be considered in all respects as illustrative and not restrictive, reference being made to the appended claims rather than to the foregoing description to indicate the scope of the invention.

I claim:

1. In a reusable insulation jacket assembly for a tubing splice and a termination of preinsulated bare tubing after the preinsulation has been removed, the tubing commonly conveys steam, hot materials, condensate, lubricants, cryogenic fluids and cold materials typically used in heating and air conditioning, power facilities, food processing and petrochemical facilities, the insulation jacket assembly improvement comprising:

(a) a reusable, rectangular, flexible fiberglass mat having an inside face, an outside face, first and second elongate sides, a width and relatively short first and second ends;

(b) a frustum-shaped, rigid, metallic, reducing adaptor conformed to be adaptively partially fit over and around the end of the preinsulation and to neck down and to be adaptively closely fit over and around the bare tubing; and (c) complementary releasable fastening means fastened on the outside face along the first and second elongate sides so that the inside face confronts and wraps around the bare tubing beginning adjacent and touching the frustum adaptor and to releasably interlock the overlapping complementary fastening means for securely holding the mat around the tubing so that the mat insulates the tubing and prevents an individual from being burned from contacting the otherwise exposed tubing.

2. The insulation jacket of claim 1, further comprising a sealant layer on the outside face of the mat to seal the mat from moisture, water and harsh chemicals.

3. The insulation jacket of claim 2, wherein the sealant layer is silicone.

4. The insulation jacket of claim 1, wherein the fastening means comprises complementary hook and loop materials.

5. The insulation jacket of claim 1, wherein the width of the mat is enough to permit the mat to overlap itself as to assure the fastening means does not contact the tubing.

6. The insulation jacket of claim 1, further comprising a silicone sealant placed on the mat ends adjacent the tubing and the frustum adaptor.

7. The insulation jacket of claim 1, wherein the frustum adaptor is aluminum.

8. The insulation jacket of claim 2, wherein the frustum adaptor is conformed to be adaptively secured to the end of the preinsulation by securing means for securing the frustum adaptor to the preinsulation end, the securing means chosen from a selective group consisting of a screw, silicone adhesive, and a tie.

* * * * *